Patented July 30, 1946

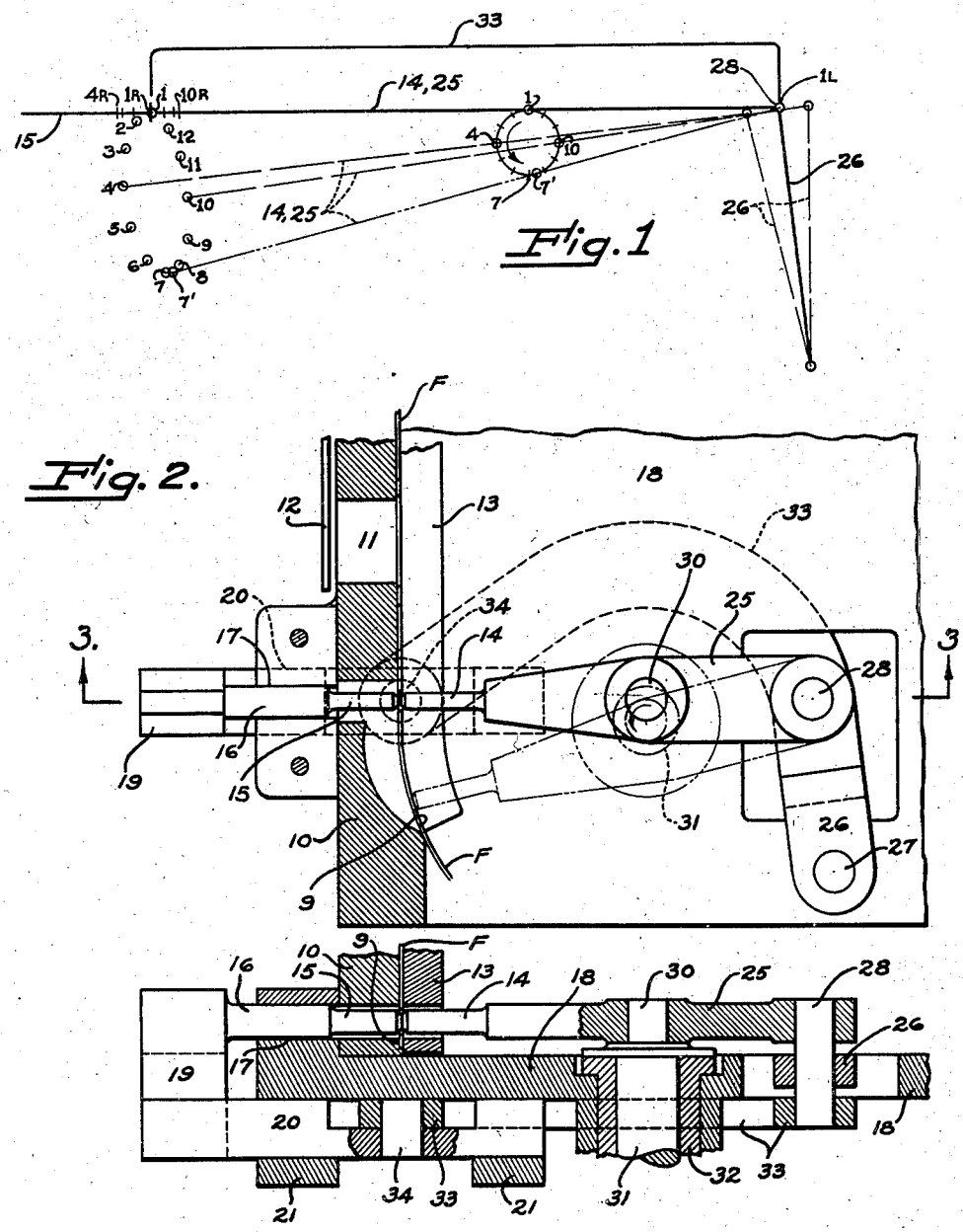

2,404,875

UNITED STATES PATENT OFFICE 2,404,875

KINETOGRAPH MOVEMENT

George H. Worrall, Los Angeles, Calif.

Application February 7, 1944, Serial No. 521,359

6 Claims. (Cl. 88—18.4)

The general purpose of the present invention is to produce an improved type of combined film moving mechanism and film registering means. Such combined mechanisms are known; my improvement is concerned mainly in the provision of a design and arrangement wherein the film moving claw and the pilot pin engage the same film perforation instead of engaging two perforations which are longitudinally spaced from each other, as is done in known mechanisms.

In known mechanisms the register pin commonly engages a film perforation which may be several perforations removed from the one engaged by the moving claw pin. Film shrinkage, which is quite variable, causes considerable variation in the film dimension between those two perforations; with the result that when a shrunk film is held in register by the register pin its claw perforation is never in full register with the entering claw, and that also when the claw is withdrawing or has withdrawn from its perforation the perforation which the register pin then enters is not in register with it. The result is that upon the entry of either pin the film has to be moved into registering position by the entering pin; involving a sawing action on the perforation edge which is particularly damaging to film at low temperatures or in high speed picture taking.

I minimize those objectionable features by providing a mechanism in which the two pins engage one and the same perforation. Further features and advantages will appear. A typical illustrative embodiment of my invention is shown in the accompanying drawing, in which:

Fig. 1 is a diagrammatic illustration of the movement.

Fig. 2 is a vertical section of an illustrative form of mechanism; and

Fig. 3 is a section on line 3—3 of Fig. 2.

In the drawing 10 designates an aperture plate which may have its exposure aperture at 11; 12 indicating the shutter. Film F moves in a race 9 between the aperture plate and a film gate 13. The gate may open in any usual manner to allow threading and removal of the film; for instance it may be considered as being moved simply toward the right in Figs. 2 and 3 to open up the film race. It may be noted that in Fig. 2, the film gate is shown merely in outline in order to clarify the showings of other parts behind it. The film race in plate 10 is curved in its lower portion to correspond with the travel of claw pin 14.

Assuming that the film is to be moved down, as is usually the case, the claw pin 14 and register pin 15 are located below aperture 11 and are arranged in opposition to each other so that the two pins enter a film perforation from opposite sides.

As shown in the illustrative design, register pin 15 is formed as an end portion of a slider 16 which is guided in slide bearing 17 mounted on the frame or on the main mounting plate 18 of the mechanism. A cross head 19 connects slider 16 with another slider 20 which slides in slide bearings 21 mounted on plate 18. The whole mounting is such that the register pin moves back and forth on its own longitudinal axis to enter into or withdraw from a film perforation. Functionally, the parts 19 and 20 may be considered as a part or extension of the register pin.

The claw arm is shown at 25. Claw pin 14 is formed on the forward end of arm 25, and the rear end of the arm is movably supported in such a manner that the claw pin (in its horizontal position at the beginning of the film engaging and moving stroke shown in full lines in Fig. 2) may move either exactly or substantially along a line coincident with the horizontal axis of register pin 15. Thus, the rear end of claw arm 25 may be supported and guided in a longitudinal slide; but a supporting link such as shown at 26 performs the supporting and guiding functions substantially as well as a straight side, and is preferably for mechanistic reasons. Consequently in the drawing I show rear end of the claw arm carried upon a pivot pin 28 which is carried by the upper end of link 26 pivoted at its lower end at 27 to frame plate 18. For reasons which will appear, the link stands in a position substantially vertical, but preferably inclined slightly forwardly, when the parts are in the positions shown in full lines in Fig. 2. As here shown the length of link 26 is the same as the length of the claw arm between eccentric 30 and pivot pin 28.

Any suitable sort of cam, crank or eccentric movement may be used for moving the claw arm and pin. I here show a simple eccentric movement consisting of an eccentric 30 on a driving shaft 31 mounted in bearing 32 in plate 18. The movement path of the end of the claw pin is indicated diagrammatically in Fig. 1 and will be described later. It will suffice at the instant to say that, with the claw pin in the position shown in full lines in Fig. 2 the center of eccentric 30 is in a position substantially directly above the center of shaft 31, and upon rotation of the shaft in the counter-clockwise direction indicated, pin 14 enters the perforation in film 12, moves down to the position shown in dotted lines in Fig. 2 where it withdraws from the film, and then moves upwardly to the full line position again. With link 26 in substantially a vertical position at the beginning of the stroke, the initial film engagement movement of claw 14 is very nearly a movement in a straight line toward the left.

Register pin 15 is connected to the claw movement by a connecting link such as is shown at 33 which connects at its rear end directly to pin 28 and at its forward end to a pin 34 mounted in slider 29. When the parts are in the position shown in full lines in Fig. 2, the register pin, the claw arm and pin, and pivot pins 28 and 34, are all in a straight line; and the center of pin 34 is in the plane of the film—or, otherwise expressed, the projected center line of pin 34 will pass centrally between the opposing ends of register pin 15 and claw pin 14 which, at this time, are separated by a distance which need be not greater than the film thickness. Register pin 15 and claw 14 are directly interlinked by the fact that both of them are connected to pin 28; and any movement imparted to pin 28 by the claw movement will move register pin 15 along a horizontal line in opposition to movement of the claw pin 14 along the same horizontal line. Thus, in the position shown in Fig. 2, the claw pin is just entering the perforation substantially horizontally and the register pin is just withdrawing in a horizontal movement at the same or very nearly the same horizontal velocity as the claw pin. Due to the direct linkage between the two pins, and their substantially equal horizontal movements in and about the positions of Fig. 2, the clearance between their opposed ends can be extremely small. It is only necessary that the clearance be sufficient to clear the two pin ends without friction as the claw pin tips down about pivot pin 28 toward the dotted position of Fig. 2; and that necessary clearance is only a small fraction of normal film thickness—clearance of the order of a few ten-thousandths of an inch. Thus, if desired, the clearance may be so small that the claw pin enters the perforation before the register pin finally leaves it, and that, conversely, the register pin re-enters a perforation in the full line position of Fig. 2 before the claw pin finally leaves the film in the broken line position. In both these positions pivot pin 28 is in the full line position of Fig. 2; and the curvature of film race 9 in plate 10 is centered on that position of pin 28.

The motions of the several parts are diagrammed in Fig. 1 where the register pin 15, the claw arm and pin 14, 25, the connecting link 33, and the link 26, are all represented by lines with the same designating numerals as in Fig. 2. The centers of the small circles which are numbered 1 to 12 consecutively represent the successive positions of the end of the claw upon rotation of the eccentric through a complete revolution, starting with the eccentric center in the position labeled 1 in Fig. 1. The broken lines represent the position of the claw arm and pin in typical positions, and the broken lines 26 represent the positions of link 26 for positions 4 and 10 of the claw pin.

Starting with the position shown in full lines in Fig. 2 and as position 1 in the diagram, rotation of the eccentric in counterclockwise direction moves the claw arm and pin first in a horizontal direction toward the left to enter the film perforation. At the same time the register pin 15 is withdrawing from the film perforation and, during claw pin movement at and close to position 1, with the axis of the claw arm and pin in or very close to horizontal position and very close to coincidence with the horizontal axis of the register pin, the horizontal velocities of the two pins are either equal or very nearly so. With the end of the claw in position 1, the opposing end of the register pin is in position 1R very closely coincidental with the end of the claw. As the eccentric moves from position 1 toward position 4, the forward end of the claw pin passes completely through the film perforation and moves downwardly as well as forwardly. Position 4R of the register pin corresponds to position 4 of the claw. The claw leaves the film (or its end reaches the center of the film) at position 7' with pivot pin 28 in the same position (1L) which it occupied in claw position 1. Consequently, as the claw leaves the film, the register pin has returned to its position 1R where it is again entering the film—either just entering or substantially half way through it, depending on the magnitude of the clearance previously spoken of. The claw then passes on through positions 8 to 12 (position 10R of the register pin corresponds to claw position 10) and back to position 1) to re-engage the film in the perforation which the register pin engaged when the claw left the film at position 7'.

In somewhat further detail of the movement of the claw in and close to position 1, the following observations may be made. If link 26 is positioned to stand precisely vertical in position 1 (so that 28 would be moving horizontally in that position, as it would if a horizontal slide were substituted for the link) then the end of the claw in position 1 will move precisely horizontally and that position will be the top position of the claw end. Immediately beyond that position and while entering into full perforation engagement, the claw end would start moving down. That last statement is particularly true if the spacing between the claw and register pins is completely wide and/or if, as is usual, the pins are beveled on their ends and have to enter the perforation a substantial distance before making full perforation engagement.

With link 26 tipped slightly forward in position 1, pivot pin 28 is travelling slightly downwardly in that position. With eccentric 30 travelling horizontally in position 1, the claw end in that position is travelling slightly upwardly to reach its uppermost position slightly beyond position 1. At that uppermost position the claw end is then travelling horizontally, due to the fact that the centers of eccentric 30 and of pivot pin 28 are instantly moving in parallel directions. Then as the parts move on toward position 2 the eccentric begins to move down faster than pin 28 and the claw end starts its downward movement, reaching a position which is horizontally level with position 1 at about the time full perforation engagement takes place. Thus, the full perforation engagement takes place with the claw moving in on over-all horizontal direction in line with the axis of the register pin.

In the design as here illustratively shown, link 26 stands about 7° forward of the vertical in position 1. The length of the link, and also the distance 28—30, is ½ inch. The eccentric radius is 1/16 inch and the total claw length is approximately 1¼ inches or slightly less. With these relative dimensions, the link stands approximately vertical in claw position 10; and in position 7' where the claw withdraws it moves out of the perforation nearly straight along its length because pivot pin 28 in position 1L is moving along a line not greatly removed from coincidence with the claw length nor greatly non-parallel with the instant movement of eccentric 30 in position 7'.

From what has been said it will be recognized that the engaging movement of the claw is along a substantially straight horizontal line directly in register with the register pin. The film perforation is engaged by the claw with no, or no substantial, film movement.

When the claw leaves the film, the film engaging movement of the register pin is along a straight line (preferably purely reciprocatory, although it can be broadly viewed as oscillatory). If the film has shrunk or otherwise changed in longitudinal dimension, the film shifting which is necessarily caused by the register pin is limited to the small amount of dimensional change which has taken place in the film, with relation to the standard dimension for which the movement is designed, in the length of only a single film frame. Thus the registering action is accompanied by a minimum film shift, if any; and the claw engaging action is accompanied by no film shift. The film is registered most accurately and wear and breakage at the perforations is minimized.

I claim:

1. In kinetograph mechanisms having a frame with a film guiding race, a film moving claw adapted to engage in a film perforation, means for moving the claw in a motion which includes a movement in which the claw moves from one side of the film race toward and through the plane of the race on a line transverse of the race, a film registering pin mounted in the frame for oscillatory movement at the opposite side of the film race toward and away from the film race on the same transverse line, and means linking the claw and register pin together and transmitting the claw movement along said transverse line to the pin, whereby the claw and pin will move in substantial unison along the same transverse line to engage and disengage one and the same film perforation.

2. In kinetograph mechanisms having a frame with a film guiding race, a claw carrying pivot mounted on the frame to move transversely toward and from the film race at one side thereof, a film engaging claw pivotally mounted on said pivot and extending therefrom toward the race, means adapted to move the extended end of the claw in a film engaging and disengaging and moving motion which includes a movement on a movement line substantially at right angles to the race and passing through the claw pivot, a film registering pin mounted in the frame for oscillatory movement at the opposite side of the film race toward and away from the race on the same line of movement, the mutually approaching ends of the claw and register pin being in spaced opposed positions on said movement line when the claw is located on said movement line, and a movement transmitting link pivoted at one end to the claw carrying pivot and at the other to the registering pin.

3. In kinetograph mechanisms having a frame with a film guiding race, a claw carrying pivot mounted on the frame to move transversely toward and from the film race at one side thereof, a film engaging claw pivotally mounted on said pivot and extending therefrom toward the race, means adapted to move the extended end of the claw in a film engaging and disengaging and moving motion which includes a movement on a movement line substantially at right angles to the race and passing through the claw pivot, a film registering pin mounted in the frame for oscillatory movement at the opposite side of the film race toward and away from the race on the same line of movement, the mutually approaching ends of the claw and register pin being in spaced opposed positions on said movement line when the claw is located on said movement line, and a movement transmitting link pivoted at one end to the claw carrying pivot and at the other to the registering pin, the axis of the last mentioned pivotal connection being centrally located with reference to the said spaced opposed positions of the claw and pin ends.

4. In kinetograph mechanisms having a frame with a film guiding race, a claw carrying pivot at one side of the race movable to and from the race on a line transverse thereof, a claw mounted at one end on said pivot and extending its other end toward the race, and claw moving means adapted to move the extended end of the claw in a film engaging and moving motion which includes a film engaging movement in a direction toward the race on a movement line substantially at right angles to the race and passing through the claw pivot; the improvement in film registering means which includes a register pin mounted in the frame for reciprocatory movement at the opposite side of the film race toward and away from the race on the same right angled line of movement, and means transmitting to the register pin the movement of the claw carrying pivot along said line of movement.

5. In kinetograph mechanisms having a frame with a film guiding race, a claw carrying pivot at one side of the race movable to and from the race on a line transverse thereof, a claw mounted at one end on said pivot and extending its other end toward the race, and claw moving means adapted to move the extended end of the claw in a film engaging and moving motion which includes a film engaging movement in a direction toward the race on a movement line substantially at right angles to the race and passing through the claw pivot; the improvement in film registering means which includes a register pin mounted in the frame for reciprocatory movement at the opposite side of the film race toward and away from the race on the same right angled line of movement, the mutually approaching ends of the claw and register pin being in closely spaced opposed positions on said movement line when the claw is located on said movement line, and a motion transmitting link pivoted at one end on the claw carrying pivot and at the other end to the register pin on a pivot axis transverse of its line of movement.

6. In kinetograph mechanisms having a frame with a film guiding race, a claw carrying pivot at one side of the race movable to and from the race on a line transverse thereof, a claw mounted at one end on said pivot and extending its other end toward the race, and claw moving means adapted to move the extended end of the claw in a film engaging and moving motion which includes a film engaging movement in a direction toward the race on a movement line substantially at right angles to the race and passing through the claw pivot; the improvement in film registering means which includes a register pin mounted in the frame for reciprocatory movement at the opposite side of the film race toward and away from the race on the same right angled line of movement, the mutually approaching ends of the claw and register pin being in closely spaced opposed positions on said movement line when the claw is located on said movement line, and a motion transmitting link pivoted at one end on the claw carrying pivot and at the other end to the register pin on a pivot axis transverse of its line of movement and located centrally with reference to the said spaced opposed positions of the claw and pin ends.

GEORGE H. WORRALL.